Figure 1:
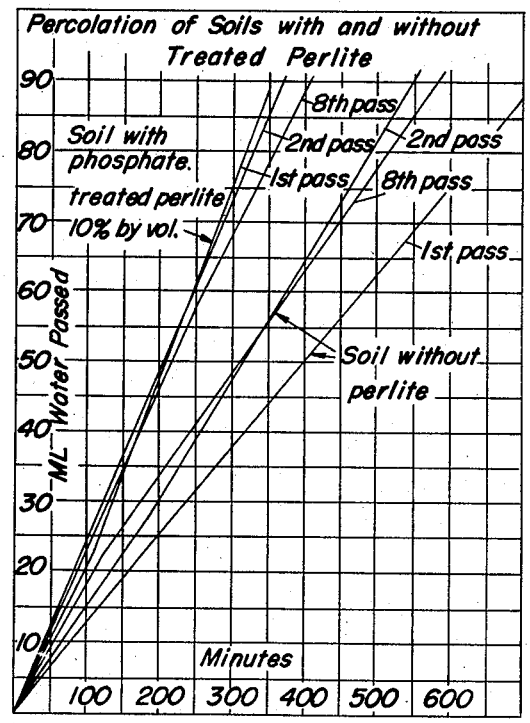

Sept. 15, 1959  E. P. CHAPMAN, JR., ET AL  2,904,424
AGRICULTURAL PRODUCT AND METHOD
Filed June 11, 1954

INVENTORS
EDWARD P. CHAPMAN, JR.
JOHN A. WOOD
BY
ATTORNEY

United States Patent Office 2,904,424
Patented Sept. 15, 1959

2,904,424

AGRICULTURAL PRODUCT AND METHOD

Edward P. Chapman, Jr., and John A. Wood, Albuquerque, N. Mex., assignors to Peerless Oil and Gas Company, a corporation Application June 11, 1954, Serial No. 436,118

9 Claims. (Cl. 71—52)

Our invention relates to the method of producing compositions having a high degree of utility in both farm and garden agriculture, and as well to the product itself. More specifically, our invention concerns the application of perlites to agricultural use, while more specifically it treats of both the production of treated perlitic agricultural products and the method of producing the same.

An object of our invention is to produce a product which is fireproof, non-hygroscopic, of low bulk density, displaying good storage and flow qualities; which product, when added to the soil, effectively participates in conditioning the same, minimizing its tendency to pack and contributing highly to moisture and plant food retention; which product may be impregnated—and this in simple, rapid and ready manner—with controlled substantial percentages of plant food or nutrient, including not only major and secondary foods, but as well, mineral trace elements in either readily or slowly soluble form, the impregnation of such product with the foregoing plant nutrients being such that rate and mode of subsequent leaching of the nutrients out of the product and into the soil can be controlled within wide degree.

Another object of our invention is to provide a highly porous carrier or filler for a variety of high analysis plant nutrients; said carrier or filler containing in intimate association and being impregnated with chemical plant foods, which, being held in the pores and on the surfaces of the particles, may be contacted readily by plant root capillaries, which may easily invade the pores, thus encouraging rapid assimilation of nutrient, and correspondingly rapid, healthy growth of the root system and of the entire plant; and which carrier or filler is highly uniform both as to physical and chemical qualities, with uniform grading of particle sizes, readily lending itself to stage impregnation of the nutrient constituents thereof, and to subsequent controlled leaching of those constituents into the soil into which the product is incorporated.

A still further object is to provide a method of incorporating into intimate association, each with the other, active plant nutrients and a perlitic carrier therefor, the resulting end porduct being bulky and light in weight, with substantial percentages of retained nutrient ingredients, thus admirably meeting the usual criteria for high analysis plant food, the resulting product also displaying good storage and flow qualities, with uniform gradation of particles and controlled leaching of the nutrient into the soil; which method is at once economical, rapid, simple and certain, all with requisite flexibility such that both amount and type of nutrient, and rate and manner of solubility thereof into the soil, can be nicely fitted within wide limits to suit requirements of particular horticultural problems.

All the foregoing, as well as many other highly practical objects and advantages, attend the practice of our invention, some of which will be obvious and others of which will be pointed out hereinafter during the course of the following disclosure, taken in the light of the accompanying drawings.

Accordingly, our invention may be considered to reside in the several materials, ingredients, compounds and compositions of matter; in the compounding and the association thereof with each other; in the several treating, manipulative and procedural steps; and in the relation and combination of each of the same with one or more of the others, the scope of the application of all of which is more fully set forth in the claims at the end of this specification.

Figure 2:
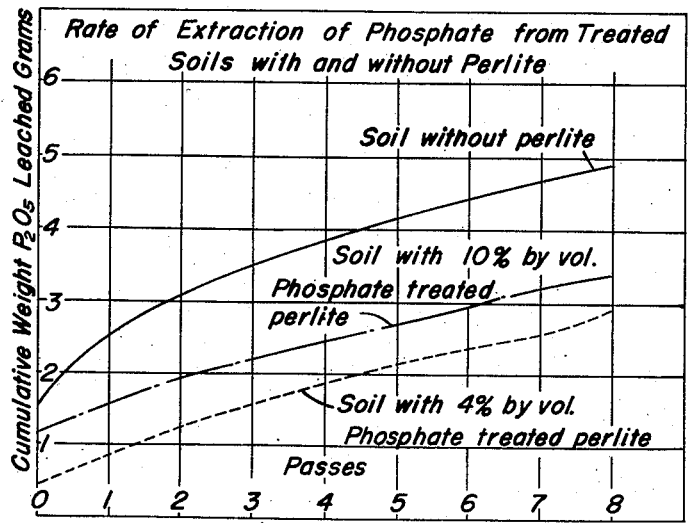

In the several views of drawings, Figures 1 and 2 are graphs which respectively show percolation rates and rates of extraction of plant nutrients for soils containing the product of our invention as compared to those without these additions.

Now, as conductive to a more thorough and ready understanding of our invention, it may be noted that in recent years, particularly with farmland high in cost and labor scant, unskilled and costly, and with demand increasing—especially with strategic location near densely populated urban areas—it has become increasingly urgent that maximum productivity be obtained from that available area which is committed to agriculture. This imposes a mandate upon the agriculturist not only that the soil be properly fertilized but that as well, it be properly conditioned in all possible respects, such as by aeration and water-retention, to insure optimum root and plant growth.

Many attempts have been made to achieve these objectives, and some degree of success has been realized. Generally however, fertilizers when used alone tend to leach too rapidly out of the soil, i.e., their utility is temporary. Such fertilizers alone, particularly those of chemical origin, do not impart a great degree of soil-conditioning qualities to the ground. Moreover, difficulty is often encountered in use, due to the comparatively high concentration of these chemical-base nutrients, i.e., they "burn" the foliage.

In those instances where carriers or diluents are employed for the fertilizer, requisite dilution of the active nutrient ingredients can be achieved so that the food substances no longer are present in too highly concentrated form. Rate and manner of leaching in most instances, however, are not adequately subject to control, and frequently such carriers have no soil-conditioning or aerating properties. Moreover, such carriers are frequently quite expensive, and tend to price themselves automatically out of the market except perhaps for limited use in the household garden. Moreover, in many instances the composite materials, comprising prior art plant food and carriers therefor, are of such nature as to be of questionable benefit, and this while possessing poor storage and transportation characteristics.

In short, although much attention has been given to the provision of adequate soil conditioning and plant feeding materials, when viewed from a practical aspect, these efforts have signally and almost uniformly fallen substantially short of the objectives towards which they were aimed. While one product may prove unsatisfactory for one reason, another will prove unacceptable for an entirely different reason. The agriculturist has heretofore been unable to combine the beneficial factors of various ingredients with elimination of the detrimental qualities thereof, in a product which possesses requisite beneficial qualities.

An important object of our invention, therefore, is to remove in substantial nature the many disadvantages and defects heretofore confronting the art and at the same time to produce in simple, rapid and economical manner, certain and predictable in result, a light-weight, porous, perlitic-base agricultural product which displays uniform gradation of particles, and which retains therein, with controlled leaching qualities imparted thereto, required high content of all necessary plant foods including major plant foods, secondary plant foods and important mineral trace elements; which product effectively contributes to ready and effective soil conditioning and plant feeding and which retains desired good qualities over requisite long periods of time.

In the practice of our invention we prefer to employ perlite as a base, although certain other rocks of volcanic origin, such as volcanic ash, pitchstone and certain forms of pumice, may be used in the same manner as perlite. According to one satisfactory definition, perlite may be considered to be a siliceous volcanic rock containing dissolved (magmatic) water in sufficient quantities to expand into bubbles when the material is heated to a suitable point in the softening range. As found in nature, perlite rock ranges from white to black in color, and from opaque to sub-translucent, usually being found as a light-colored, sub-translucent material. Considered megascopically, two distinct types of perlite are recognized. That which is found as a dense, vitreous rock is referred to as glassy ore. That which is found as a cellular, spongy rock is classed as pumiceous ore. A practical industrial classification of perlite is based on content of magmatic water, and according to this classification, perlite is that class of the general type referred to above which contains from about two to about five percent magmatic water in the ore.

The important characteristic of perlite is that upon controlled heating to temperatures ranging from about 1500 degrees to about 2000 degrees F. the rock particles undergo tremendous volumetric expansion. This results from the action of the entrained water springing into steam while seeking release from the perlite in which it is entrapped. The resultant expanded forms of the perlitic material are found to have a thin-walled minutely cellular structure. Consequently, they are very light in weight.

As illustrative of the tremendous expansion which perlite undergoes during heat treatment it may be noted that whereas crude perlite ore, crushed and properly sized, usually has a bulk density of from sixty to eighty pounds per cubic foot, in its expanded form perlite's bulk density ranges from as low as one pound up to about twenty-five pounds or more per cubic foot. While the nature of the finished product—that is, the expanded perlite—depends to some extent upon the characteristics of the raw ore employed, primarily these characteristics are closely related to and depend upon the size and gradation of the ore particles before expansion, the method of furnacing, and the pyrometric control. As further preliminary considerations, it may be noted that the expanded perlite can be made either to have globular particles with sealed exterior surfaces; or it may be produced to have fragmental particles with many pores open to the surface. Usually we prefer to use the latter form for purposes of this invention.

A typical chemical analysis for perlite ore is given in Table I below:

TABLE I

*Chemical analysis of typical perlite ore*

|  | Percent |
|---|---|
| $SiO_2$ | 72.91 |
| $Al_2O_3$ | 12.52 |
| $Fe_2O_3$ | 1.28 |
| $CaO$ | 1.18 |
| $MgO$ | 0.10 |
| $Mn$ | 0.28 |
| $K_2O$ | 3.62 |
| $Na_2O$ | 4.01 |
| $P_2O_5$ | 0.00 |
| Ignition loss | 4.50 |
|  | 100.40 |

The perlite ores may be mined, and then comminuted and sized by either wet or dry method. While we prefer to use minus 30 mesh size gradations of ore, a minus 50 mesh ore is quite satisfactory. We find that in general, ore gradations above 50 mesh are more free-flowing and tend to pack less during storage or transport.

The expanded perlite is free flowing and displays great ability to hold tenaciously plant food content physically within and on the surfaces of the individual particles thereof, minimizing tendency of the active constituents to leach out too rapidly into the soil in which our new product is incorporated. Not only does our new product impart, to substantial degree and in manner which will be pointed out hereinafter, highly important soil-conditioning properties, but it is readily adaptable to flexible formula control to provide a broad range of plant food content, and with this either or both prolonged or accelerated availability of the plant food once the composition has been mixed with the soil.

Accordingly, our invention comprises the intimate impregnation of the perlite base with a substantial and controlled quantity of one or more selected plant nutrients, in such ways that the availability of the plant food may be varied over a wide range. More specifically, our invention consists, in part, of basic methods of incorporating substantial and controlled amounts of plant nutrients into a perlitic base, chief among which are: (1) Impregnation of an expanded perlite with solutions, slurries or suspensions of plant food carriers; (2) impregnation of unexpanded perlite ore with solutions, slurries or suspensions of plant food carriers, followed by expansion of the treated ore; and (3) solution-, slurry-, or suspension-impregnation of the expanded product of a perlite ore which was impregnated before expansion.

In accordance with the practice of our invention we have conducted exhaustive laboratory experiments with a number of different perlite ores. All but one of these were pumiceous ores; the other one was a glassy perlite. On the basis of these tests we find that ores having a bulk density in ground form passing a 30 mesh sieve, ranging between 60 and 80 pounds per cubic foot are highly satisfactory for our purpose. While we prefer to use a minus 30 mesh ore, minus 50 mesh or finer, and with some ores much coarser gradations may be used satisfactorily. A preferred range of bulk density in pounds per cubic foot for the minus 30 mesh or minus 50 mesh ores lies between about 62.4 and about 69. In tests conducted upon the nine different types of ores referred to, our results show that in nearly every instance the greater part, and in some cases most, of the expanded products pass a 30 mesh sieve and much of the material is retained on a 50 mesh sieve with a comparatively small amount passing the 100 mesh sieve.

We expanded these ores in a furnace under carefully controlled conditions of temperature, flame velocity, flame contact time, and rate of feed. The experimental data thus obtained are presented in the following Table II:

TABLE II

*Some physical properties of various perlites*

| Type | Bulk density, −30 M ore p.c.f. | Expansion ratio | Bulk density, expanded prod. p.c.f. | Expanded prod. sieve analysis | |
|---|---|---|---|---|---|
| | | | | U.S. sieve number | Vol. percent retained |
| 1 | 69 | 6.3 | 10.2 | 30 | Tr. |
| | | | | 50 | 43.3 |
| | | | | 100 | 35.2 |
| | | | | 140 | 6.0 |
| | | | | 200 | 6.4 |
| | | | | −200 | 2.3 |
| 2 | 69 | 6.5 | 11.7 | 30 | 1.2 |
| | | | | 50 | 49.4 |
| | | | | 100 | 33.2 |
| | | | | 140 | 6.8 |
| | | | | 200 | 4.1 |
| | | | | −200 | 4.0 |
| 3 | 62.4 | 6.5 | 10.3 | 30 | Tr. |
| | | | | 50 | 27.8 |
| | | | | 100 | 37.6 |
| | | | | 140 | 13.6 |
| | | | | 200 | 9.0 |
| | | | | −200 | 12.0 |
| 4 | 64 | 6.7 | 10.7 | 30 | 0.3 |
| | | | | 50 | 52.0 |
| | | | | 100 | 19.5 |
| | | | | 140 | 10.9 |
| | | | | 200 | 7.0 |
| | | | | −200 | 10.3 |
| 5 | 64 | 6.6 | 9.3 | 30 | 0.4 |
| | | | | 50 | 43.0 |
| | | | | 100 | 36.0 |
| | | | | 140 | 8.2 |
| | | | | 200 | 5.0 |
| | | | | −200 | 7.4 |
| Avg. 1-5 | 65.6 | 6.5 | 10.4 | 30 | 0.4 |
| | | | | 50 | 43.1 |
| | | | | 100 | 30.5 |
| | | | | 140 | 9.1 |
| | | | | 200 | 6.3 |
| | | | | −200 | 8.8 |

We find the materials thus prepared have splendid qualities of retaining solutions therein. This is so, whether these solutions may be of major plant foods, secondary plant foods or trace elements. In preliminary investigations, we employed two simple impregnation methods. In each procedure, we employed both hot and cold solutions. We carried out the work, basis of the following tests, at room temperatures and under atmospheric conditions, except that one series of impregnations was made at elevated pressures and temperatures.

In the first procedure, which for simplicity we call the slurry method, and according to one phase thereof, we slurried together, at room temperature, equal volumes of expanded perlite obtained according to the practice set forth herein, together with a liquid, which illustratively may be water. We continued mixing the slurry for approximately one minute. The slurry was then poured onto a pre-saturated filtering medium. We vibrated this medium intermittently until filtrate ceased to pass through the filtering medium. The amount of water retained in the filter cake was recorded as percentage retention by volume. It represents the maximum amount of solution retained by absorption and adsorption and entrapped in interstices between particles, before any appreciable evaporation loss.

As a second phase of the same procedure we conducted the same slurry method as before, but this time under hot conditions. To do this we combined equal volumes of expanded perlite with cold distilled water, and then placed the combination on a hot plate until boiling point was reached. Upon removal from the hot plate, we stirred the slurry gently for fifteen seconds and then poured it on the pre-saturated filter medium. Drainage under vibrating conditions was carried out as in the first or cold phase. The amount of water retained in the filter cake was recorded as percentage by volume.

In the second procedure, which we conveniently call the static method, and in the cold phase thereof, we slowly poured a measured volume of cold distilled water over an equal volume of expanded perlite which had just been placed on a pre-saturated filter medium. The water was drained off under intermittent vibration as in the first procedure. The volume of solution retained in the filter cake was recorded as volumetric percentage retention.

In the second or hot phase of the second procedure, we poured a measured amount of boiling distilled water over an equal volume of expanded perlite, under the same conditions as recited with respect to the cold phase. We found that greater solution retention was obtained with hot solution by both procedures in nearly every instance; and that the expanded perlites passing a 30 mesh sieve and falling within the specification limitations of Table II herein are definitely superior to other sizes and gradations in their ability to hold solution without becoming over-wet.

Examples of the foregoing results are set forth in the following Table III:

TABLE III

*Solution retention of various materials*

[Volumetric determinations with distilled water]

(A) PROCEDURE 1.—SLURRY

| Material | Density, p.c.f. | Cold—retention, vol. percent | Hot—retention, vol. percent |
|---|---|---|---|
| Exp. products from −30 M perlite ores: | | | |
| Ore No. 1 | 10.6 | 50 | 52 |
| Ore No. 2 | 11.5 | 50 | 54 |
| Ore No. 3 | 10.6 | 50 | 55 |
| Ore No. 4 | 11.5 | 49 | 51 |
| Ore No. 5 | 10.9 | 50 | 54 |
| Ore No. 5 (pilot plant) | 9.0 | 51 | 54 |
| Avg. 1-5 | 10.7 | 50 | 53.3 |
| Exp. products from −50 M perlite ores: | | | |
| Ore No. 1 | 10.6 | 49 | 52 |
| Ore No. 2 | 7.5 | 47 | 58 |
| Ore No. 3 | 3.0 | 38 | 47 |
| Ore No. 4 | 5.0 | 47 | 53 |
| Ore No. 5 | 10.0 | 43 | 49 |
| Exp. perlite products having other gradations and from other sources: | | | |
| Product A | 9.2 | 46 | 43 |
| Product B | 12.5 | 32 | 32 |
| Product C | 14.4 | 42 | 40 |
| Products other than perlite recommended and used in agriculture: | | | |
| Product D | 37.5 | 52 | 53 |
| Product E | 38.0 | 48 | 52 |
| Product F | 10.0 | 33 | 36 |
| Product G | 6.2 | 32 | 42 |

(B) PROCEDURE 2.—STATIC

| Material | Density, p.c.f. | Cold—retention, vol. percent | Hot—retention, vol. percent |
|---|---|---|---|
| Exp. products from −30 M perlite ore: | | | |
| Ore No. 1 | 10.6 | 50 | 52 |
| Ore No. 2 | 11.2 | 50 | 56 |
| Ore No. 3 | 10.6 | 50 | 56 |
| Ore No. 4 | 11.5 | 49 | 51 |
| Ore No. 5 | 10.9 | 50 | 57 |
| Ore No. 5 (pilot plant) | 9.0 | 51 | 60 |
| Avg. 1-5 | 10.7 | 50 | 55.3 |
| Exp. products from −50 M perlite ore: | | | |
| Ore No. 1 | 10.6 | 49 | 52 |
| Ore No. 2 | 7.5 | 45 | 56 |
| Ore No. 3 | 3.0 | 38 | 52 |
| Ore No. 4 | 5.0 | 48 | 54 |
| Ore No. 5 | 10.0 | 43 | 53 |
| Exp. perlite products having other gradations and from other sources: | | | |
| Product A | 9.2 | 43 | 39 |
| Product B | 12.5 | 27 | 34 |
| Product C | 14.4 | 45 | 50 |
| Products other than perlite recommended and used in agriculture: | | | |
| Product D | 37.5 | 47 | 54 |
| Product E | 38.0 | 43 | 53 |
| Product F | 10.0 | 33 | 36 |
| Product G | 6.2 | 32 | 32 |

A. −6 mesh plaster aggregate.
B. −4 +30 mesh horticultural product.
C. −4 mesh concrete aggregate.
D. −30 mesh pumice.
E. −50 mesh pumice.
F. −100 mesh diatomaceous earth agricultural product.
G. −6 +30 expanded vermiculite agricultural product.

We have also found, as may be inferred from the data in Table III, that expanded perlites permit ready impregnation with water solutions of the major plant foods in sufficient quantity to conform to the standards of so-called high-analysis fertilizers, that is, products containing from twenty to forty units of available major plant foods, "units" being a measure of weight percentage available for plant use. Moreover, we find that we can vary within wide limits the exact percentage availability of such plant foods. We find that retention of the major percentages of the impregnated plant food is within the voids of the expanded perlite particles. This imparts slow leaching qualities, which are highly desirable. At the same time, some portion of the precipitated salts is adsorbed or occluded on exterior surfaces of the perlite particles. This part of the contained plant food leaches into the soil much more rapidly than that portion stored within the cells of the particles. Thus there is an effective combination of the slow leaching and fast leaching qualities, or what may be termed "stage leaching."

As illustrative of the foregoing, we incorporate muriate of potash (KCl) as a major plant food within the perlite particles. This is done either with potash "manure" salts, containing about 22% $K_2O$, or with granular muriate, containing 50–60% $K_2O$. As a further illustration, we may use the sulfate form of $K_2SO_4$, usually marketed commercially on a basis of 90% $K_2SO_4$. Alternatively, we may use a third potash carrier, which also contains magnesia, namely the sulfate of potash-magnesia. This usually is sold commercially on the basis of 40% $K_2SO_4$ and 18.5 MgO.

In the practice of our invention we made hot and cold impregnations according to the slurry procedure, using an expanded perlite prepared from a pumiceous ore from Jemez Mountain deposits in Sandoval County, New Mexico, Ore No. 5 in Table III. From 100 cc. of expanded perlite weighing 16 grams and 100 ml. of the cold saturated solution of potash carrier weighing 116.5 grams, there was obtained a volumetric impregnation of approximately 50%. An analysis of the dry minus 30 mesh product resulting from this test showed a water soluble $K_2O$ content of 13.50% by weight, while the apparent bulk density was 17.5 pounds per cubic foot.

Using the hot-solution-slurry procedure in which the saturated solution was made at 100° C. under atmospheric pressure conditions, the weight of 100 cc. of the expanded perlite was 16 grams, while 100 ml. of the hot solution weighed 123 grams. The dry product was found to contain 20.2% water-soluble $K_2O$ by weight, while the apparent bulk density was 24.0 pounds per cubic foot.

The hot solution tests were repeated under elevated temperature and pressure conditions. In one such instance a temperature of the added muriate solution of 176° C. was employed at a pressure of 100 pounds per square inch. Dry product analysis was 22.9% water-soluble $K_2O$ while the apparent bulk density was 27.4 pounds per cubic foot. When the same test was conducted with muriate solution added at 250° C. under 200 pounds per square inch pressure, analysis of the dry product was 24.0% water-soluble $K_2O$ and the apparent bulk density was 29.0 pounds per cubic foot.

In another experiment, expanded perlite was introduced continuously near the bottom of a boiling saturated solution of potash "manure" salts (20.6% $K_2O$) by means of a tube fitted with a motor driven impeller. The perlite particles passed upward through the solution and were removed as a float product from the surface of the solution. The dried float product had a water-soluble $K_2O$ content of 22.4%, and a product density of 26.5 pounds per cubic foot. In a similar experiment, using a technical grade of potassium chloride (99+% KCl) the dried float product showed 54.4% water-soluble $K_2O$ upon analysis, and a density of 25 pounds per cubic foot.

In a further experiment, we slurried an expanded perlite with a hot paste made by heating pelletized triple superphosphate (46.77% $P_2O_5$, 46.19% citrate soluble $P_2O_5$) with water. The dried filter cake was ground to pass a U.S. No. 8 sieve, and separated into plus 30 mesh and minus 30 mesh fractions. Upon analysis, these fractions were found to contain 37.74% and 38.46% total $P_2O_5$, and 33.66% and 35.11% citrate soluble $P_2O_5$, respectively.

Impregnation of expanded perlite with nitrogen bearing fertilizer salts was done in a manner similar to that used for potash and phosphate. With fertilizer grade ammonium sulfate (about 21% $N_2$), the dried product proved to weigh 25 pounds per cubic foot, and to contain 13.3% $N_2$. When a solution of fertilizer grade ammonium nitrate (33% $N_2$) was used to impregnate expanded perlite, the product weighed 35 pounds per cubic foot and analyzed 28.4% $N_2$.

We found that the impregnated expanded perlites may be readily comminuted after drying, and that the resulting products exhibit excellent packaging, storage and flow characteristics.

It is apparent from the foregoing that expanded perlites corresponding in weight and size gradations as heretofore specified, serve splendidly as carriers for major plant foods, and that such perlites having a bulk density lying within the range of say, about 3 pounds per cubic foot to 12 or more pounds per cubic foot constitute excellent absorptive media. In fact, we find that expanded perlites of certain characteristics retain more solution than almost any other material of generally equivalent density. While we have found that expanded perlites obtained from pumiceous ores retain more solution than do those formed from a glassy ore, nevertheless the product from each type of ore gives highly desirable results.

Moreover, we have discovered that valuable products for agricultural use may be obtained by impregnating a perlite ore with plant nutrient carriers before expansion. In this aspect of our invention, we employ one or another of the potash carrier salts, phosphate carrier salts, or a salt or salts carrying other of the essential plant nutrients. For example, a minus 30 mesh pumiceous perlite ore was impregnated with a hot saturated solution of 60% muriate of potash, oven dried, and the product comminuted to pass a 30 mesh screen. Chemical analysis showed the product to have a water-soluble $K_2O$ content of 7.5%. After expansion to a product weighing 10 pounds per cubic foot, the water-soluble $K_2O$ content was found to be 0.3% by weight, although the total $K_2O$ content was essentially the same as before expansion of the treated ore.

As a further example, an unexpanded ore was impregnated with a phosphate carrier consisting of pelletized triple superphosphate which contained 46.8% $P_2O_5$, of which 46.2% was "citrate soluble." Chemical analysis showed the impregnated, dried, and comminuted ore to contain 11.7% $P_2O_5$, of which 10.9% was "citrate soluble." After expansion to a product weighing 18.1 pounds per cubic foot the $P_2O_5$ content was 11.7%, of which 1.4% was "citrate soluble."

Finally, using expanded perlite, we employed as an impregnating solution, one which used ammonium phosphate with muriate of potash, having an analysis of 12% $N_2$, 24% $P_2O_5$, and 12% $K_2O$. This was done to illustrate that combinations can readily be made with more than one plant food, employing generally similar means. The dried and ground product contained 7.85% $N_2$, 16.29% $P_2O_5$ and 8.08% $K_2O$.

Subsequent investigation demonstrated that in those instances where the solution-impregnation of the perlite ore was conducted prior to the expansion of the ore, then the potash and phosphate became intimately implaced within the particles of the perlite. Apparently this action took place during expansion of the ore. This process also seems to change the ratio of total plant food content to readily available plant foot content from that which existed in the original nutrient with which the ore was impregnated.

Certain benefits may be obtained by two stage treatment of the perlite. That is, impregnation is imparted first to the ore which is then expanded, and further and subsequent impregnation is given this expanded product. The final product effectively combines the slowly soluble properties of part of the plant nutrient with the additional valuable property of ready solubility of a certain percentage of its nutrient content.

Microscopic examination of the final products resulting from our process shows:

(1) When perlite ore is impregnated with nutrient solutions and then expanded, substantially all of the nutrient content enters into and becomes a part of the glass structure of the perlite cell walls.

(2) When expanded perlite is impregnated with nutrient solutions, substantially all of the re-crystallized plant food salts are emplaced within the myriad of cells of the perlite particles; while subordinate amounts are occluded or cling to the surfaces of the particles.

(3) When perlite ore impregnation and subsequent expansion are followed by a second stage of impregnation, nutrients are present both in the cell walls and within the cells of the perlite particles. The resulting combinations clearly comprise far more than purely mechanical mixtures, and nicely provide for prolonged leaching to the ground in use, although a controllable amount is immediately available to the soil in which it is incorporated.

Our process renders possible a close control of the amount of added plant food in resultant expanded perlite products, this within wide range from low to medium to high analysis. This is accomplished by producing expanded perlites impregnated with various plant foods and then intimately intermingling them to correspond to required final analysis.

We find that the potash and phosphate combinations yield dry, granular and free-flowing treated expanded perlite products which have low bulk densities. Moreover, these are consistently uniform for any given combination. Nitrogen combinations tend to remain somewhat hygroscopic.

Now, as has been stated, an important advantage of our invention is that compositions and combinations of treated expanded perlite products may be controlled to permit variable rates of extraction of plant food into the soil with which it is incorporated, that is, its rate of leaching. The results of extraction experiments with, typically, a perlite-phosphate combination 5-5-3-H are graphically shown in Figures 1 and 2 of the drawings.

The method which we employed in preparing the specimens, subjects of the two graphs, is briefly stated as follows: We prepared samples using a clay soil having 4% and 10% by volume of the 5-5-3-H product, having an apparent bulk density of 35 p.c.f. and a citrate-soluble $P_2O_5$ content of 41.25%. Additionally, we prepared a control sample by adding triple superphosphate to this soil in an amount to supply approximately the same quantity of citrate-soluble $P_2O_5$ as was contained in the sample made up with 10% by volume of the 5-5-3-H product.

We introduced about 500 cc. of each dry sample into a dispensing burette of 500 ml. capacity and mixed this sample thoroughly by turning the burette several times in end-over-end fashion. There resulted a column of soil having a diameter of approximately 1.5 inches and a length of approximately 16 inches. We then saturated the soil by adding about 250 ml. of distilled water to the top of the column and allowing to stand overnight. Excess water which drained off during this time constituted the zero pass. Successive extractions, or leachings, were thereupon made by adding 100 ml. distilled water to the soil column and allowing to drain over-night. We recorded the volumes passed at various time intervals after the addition of the water, in order to observe the rates of percolation. This rate of percolation comprises the data basis for Figure 1. Total $P_2O_5$ extracted during each pass was determined through the use of the official A.O.A.C. method and resultant data were recorded graphically in Figure 2.

In brief summary, it is noted that the rate of extraction of $P_2O_5$ is markedly lower for the soil containing the treated perlite, and that is exactly what is desired, i.e., a slow rate of leaching.

Structure of the soil is well recognized as being a highly important factor having bearing on plant growth and crop yields. A simple experiment was devised to demonstrate the improvement in soil structure resulting from the use of expanded perlite.

Four half-gallon waterproofed cylindrical containers were filled to within one inch of the top with dry, sized samples of:

(1) A typical clay soil without perlite.
(2) Clay soil mixed with 4% by volume of perlite expanded from minus 30 mesh ore.
(3) Clay soil mixed with 4% by volume of 5-5-3-H perlite-phosphate product.
(4) Clay soil mixed with 4% by volume of perlite-potash product.

All samples were covered with amounts of water known to be sufficient for saturation. Saturation was reached more rapidly on all samples containing perlite than on soil without perlite and escape of air bubbles occurred only from the perlite mixtures.

Under uniform drying conditions, all samples containing perlite were observed to have superior soil structure properties in the following respects:

(1) Significantly reduced evaporation rate.
(2) Lower volume shrinkage.
(3) Less severe surface cracking.
(4) Greater friability of soil cake during and after drying.

Moreover, as shown in Figure 1, the rates of percolation for the perlite-phosphate mixture 5-5-3-H were found to be higher than in soil alone. Thus, perlite-plant food combinations retain the soil conditioning properties of expanded perlite.

It may be inferred from the foregoing that aeration is promoted by the use of perlite and perlite-plant food compositions.

Moreover, during the foregoing and similar tests with other materials, such as agricultural grade exfoliated vermiculite, and expanded perlites from other sources and of other gradations, we observed that lightweight particles of size greater than about 20 mesh could be incorporated into the soil only with great difficulty, if at all, because of the tendency of the coarse particles to "float" on the surface of the dry soil during mixing and blending. Further, and for the same reason, we found it practically impossible to obtain a uniform distribution of the coarse, light-weight particles through the dry soil by any available mixing or blending means. With our product, sized to pass a 20 mesh or finer sieve, no such difficulties were encountered, but, on the contrary, thorough and uniform distribution of product through the dry soil was readily accomplished by simple mixing. Taken together with the solution retention data presented in Table III, for expanded perlites differing in type and gradation from our preferred product, these observations prove that our new expanded perlite product is different from and markedly superior to the other types and gradations of expanded perlite for use as soil conditioning agents. The degree of difference and of superiority is of sufficiently and unexpectedly great extent to show that, even without incorporation of plant nutrients, the product of our invention constitutes a new and useful form of matter.

According to the practice of our invenion it is also thoroughly practical to provide an agricultural product involving expanded perlite together with secondary plant food elements, and this in entirely practical combination wherein the perlite serves admirably as a carrier, filler and extender for the secondary plant food elements;

Illustratively, impregnations of the expanded perlite material, and as well, the ground perlitic ore before expansion thereof, with solutions or slurries of nutrient chemicals have been carried out in actual tests with calcium, chlorine, magnesium, sodium and sulfur carriers, these being chosen as typical of secondary plant nutrients. In particular, we have employed calcium nitrate, calcium-ammonium nitrate, mono-calcium phosphate, di-calcium phosphate, tri-calcium phosphate and calcium sulfate. Muriate of potash was employed as the carrier for chlorine. Magnesium sulfate or potassium-magnesium sulfate was introduced as the magnesium-containing nutrient. The chloride, iodide, nitrate, sulfate and acid sulfate of sodium were employed. As to the sulfur, we successfully treated the perlite in its expanded form with ammonium sulfate, ammoniated single superphosphate, single superphosphate, calcium sulfate, magnesium sulfate, potassium sulfate, potassium-magnesium sulfate and sodium sulfate.

These same secondary plant foods may be used in treating perlite both before expansion and again after expansion with good effect.

Finally, experiments adequately demonstrated that combinations of perlite with minor or trace elements can be produced in an entirely satisfactory manner. In practice according to our new teachings, either simple or composite nutrient products can readily be prepared, and to these products, which we term "perlitized trace elements," we may impart solubility characteristics which are different from known trace element carriers. With uniform composition, stabilized and low bulk density, uniform size gradation and finely granulated structure, both controlled solubility and soil-conditioning properties of high order are possessed.

Our investigations established that the soluble salts of iron, aluminum, manganese, copper, zinc, boron, molybdenum and cobalt can be combined with expanded perlite by means of either hot or cold solution-impregnation. Moreover, the chemical composition of the product can be nicely controlled within desired close limits. Among soluble salts of the trace elements which can be employed according to the practice of our invention are ferric sulfate, ferrous sulfate, aluminum sulfate, manganese sulfate, cupric sulfate, zinc chloride, zinc sulfate, sodium metaborate, sodium tetraborate (borax), sodium molybdate, cobaltous chloride and cobaltous sulfate.

We found that the perlitized trace elements exhibited adequate solubility for practical agricultural use over a wide range of particle sizes. This advantageous property was displayed in sharp contrast with known trace element carrier products. Because of this solubility over wide range of particle size, it becomes possible to select a range of particle sizes dependent largely upon desirable physical properties of the agricultural product, such as ease of handling, flowability and soil conditioning properties. Heretofore, by sharp contrast, it has been impractical to obtain a ready flowing trace element carrier product which has even moderately satisfactory solubility characteristics.

Where adequate solubility resides in the particular salt of the trace element which is employed, we find it entirely practical to incorporate the same in intimate association within the perlite carrier by spraying the hot or cold solution of such salt upon, or slurrying it with, ground perlite ore. Preferably, we use the pumiceous variety of ore. When the impregnated ore is then charged into the expanding kiln, and is there subjected to proper conditions for expansion of the perlite, we produce an intimate combination of the impregnating salts within the individual particles of the perlite. This combination takes place as the ore expands. We find it neither desirable nor necessary to quench the resulting product as the same is discharged from the kiln. Rather, we prefer to allow it to cool under normal conditions of conveying, storing and handling. The perlitized trace elements may be produced according to the foregoing practice, containing any one or all of the mineral trace elements essential to plant growth.

In some cases, however, we find that the elements or compounds of the trace materials are not sufficiently soluble to permit placing them in solution for subsequent impregnation of the perlite ore. In those cases we obtain a desired impregnation by adding the insoluble materials to the perlite ore while wet-grinding it prior to expansion. The results here achieved we find to be entirely satisfactory. Where desired, it is also possible to impregnate the soluble salts into the ore by wet-grinding.

After impregnation of the perlite ore, either by solution-treatment thereof or wet-grinding the same, and expansion in the furnace, microscopic examination of the resulting products reveals that the nutrient elements have actually entered into and become part of the glass structure of the perlite cell walls during the expansion process.

Where desired, products containing one or more perlitized trace elements may be prepared by any one of three different methods or combination thereof. According to one practice, separately expanded products from individually impregnated ore samples are mixed in typically desirable proportions and blended mechanically to form a mixture. According to the second practice the individually impregnated ore samples are mechanically mixed together before charging into the expansion furnace. According to the third practice the perlite ore before furnacing may be impregnated by any or all desired trace elements by addition during the process of wet-grinding.

The following soluble metal salts have been employed in the practice of our invention: ferric and ferrous sulfates, sodium metaborate, manganous sulfate, sodium molybdate, cupric sulfate, cobaltous chloride, zinc chloride.

Descriptions of typical products made by us are as follows:

Perlite ore treated with dilute solution of manganous sulfate solution and subsequently expanded, retained 0.54% manganese. Similarly, perlite treated with sodium molybdate solution retained a molybdenum content of 0.65%.

A mechanically blended composite made from individually impregnated ores subsequently expanded contained 0.16% manganese and 0.16% molybdenum.

In a further example of a composite product, perlite ores were individually impregnated with solutions of the salts of iron, manganese and molybdenum. After blending and expanding, the resultant product gave a retained iron content of 1.02%, a manganese content of 0.22% and a molybdenum content of 0.33%.

Moreover, we have found in the practice of our invention that "perlitized trace elements" made by impregnation of ores prior to expansion need not be limited in nutrient content to the low values shown in the foregoing examples.

As a further example of perlitized trace elements, expanded perlite was impregnated with a solution of ferrous sulfate. In a cold impregnation, 100 cc. of expanded perlite weighing 17.0 grams was slurried with 100 ml. of 15% ferrous sulfate solution at 28° C. Solution retention by volume was 58%. We then dried the resulting filter cake at 100° C. and ground the same to minus 30 mesh. We observed the bulk density of the resulting product to be 18 pounds per cubic foot, while the percentage by weight of iron in the resulting product was 5.48%.

In a hot impregnation according to the foregoing practice, we used 100 ml. of ferrous sulfate solution saturated at 50° C. with 100 cc. expanded perlite. Solution retention by volume was 62%. Upon drying and grinding the filter cake in the manner already described, we observed that the bulk density of the resulting product was 22 pounds per cubic foot and that the iron content was 16.80% by weight.

As illustrative of the leaching characteristics of our perlitized trace elements (PTE) as compared with those of fritted trace elements (FTE), we subjected manganese-treated perlite and a manganese-containing frit to a 3 stage leaching by distilled water in Soxhlet 85 ml. extractors. Each stage of leaching was estimated to be equivalent to a six inch rainfall. During the course of this investigation the leach liquors were evaporated to dryness. Thereupon the residues from each stage were analyzed to determine percentages of manganese removed, all as reported in Table IV below:

*Table IV*

COMPARATIVE EXTRACTION RATES OF MANGANESE-CONTAINING PERLITE AND MANGANESE-CONTAINING FRIT

| Sample | Mn content | Percent of contained Mn extracted | | |
|---|---|---|---|---|
| | | 1st stage | 2nd stage | 3rd stage |
| FTE | 2.66 | 0.008 | Nil | Nil. |
| PTE (1) | 0.16 | 23.9 | Trace | Trace. |
| PTE (2) | 0.54 | 17.92 | do | Do. |

It is readily apparent from the foregoing table that a distinct advantage of our product is that it offers quick solubility of a portion of the contained trace nutrient followed by slow and prolonged solubility of the remainder of such nutrient.

According to the practice of our invention, we produce an agricultural product which displays outstanding ability for taking up and intimately incorporating as part thereof, an unusually large quantity of active, fertilizer-salt-containing solution. Our process is readily adaptable to flexible formula control, enabling production of a material displaying wide range of plant food content. All the foregoing is achieved along with free-flowing qualities of the dried resulting plant food product. The noteworthy ability of the product to hold the plant food or active nutrient content thereof within the individual particles of the carrier tends to minimize segregation of the constituents and imparts long and slow-leaching qualities to the product.

The low bulk densities of our new products, which reflect relatively large volume per unit of weight, effectively contribute to the admirable soil-conditioning properties as already discussed. Moreover, a further advantage resides in the fact that by the practices of our invention the plant nutrients are uniformly distributed through a relatively large volume of product, a condition which readily lends itself to uniform distribution of active plant nutrients in the soil. We have found further that our product, comprising expanded perlite particles having a porous, cellular structure in which the nutrients have been intimately incorporated by methods according to the practice of our invention, serves as an admirable host for the root hairs of all plants studied.

It is apparent from the foregoing that perlite readily may be impregnated with desired quantities of major plant foods, or secondary plant foods, or minor elements in either the ore or the expanded form thereof. This flexibility of production can be employed advantageously in that where slow solubility—the quality of slow leaching—is desired, the product impregnation may be carried out with the ground and sized ores before expansion; while for rapid solubility or high analysis, impregnation is made into the expanded ore. This desirable practice is particularly effective in producing materials containing major and secondary plant foods. Comparatively slow solubility and lower analysis is achieved largely by impregnation prior to expansion. For combined or stage rates of solubility, that is, for the production of the product which imparts nutrient to the soil not only at the outset, but over prolonged periods of time, we treat the perlite both before and after expansion. While we do not care to be bound by the explanation, we suggest that the leaching of perlitized trace element products after prolonged stay in the ground results from an attack by soil acids on the base particles.

In the products of our invention the amounts of available nutrients can be closely controlled over a broad percentage range. Lightweight granular, free-flowing products can be made meeting the classification of high analysis plant foods. Moreover, the combinations thus produced prolong the availability of the nutrient after the product is placed in the soil, and these products improve the structural condition of the soil into which they are introduced. The products are free-flowing and do not pack during storage or shipment. Thus they may be packed in multi-wall paper containers not only for storage, but for shipment and distribution as well. Moreover, bulk handling is possible except for the very lightweight products.

By effective and judicious use of stage impregnation, i.e., impregnation first of the ore and then of the expanded product, the resulting agricultural products offer both slowly soluble and readily soluble properties of the active nutrient in a single product.

Our new product is economical and involves the use of readily available and inexpensive base materials, which latter can be readily treated in such manner as to provide controlled and prolonged leaching of the active materials from the agricultural product in general use.

All the foregoing, as well as many other highly practical advantages attend upon the practice of our invention.

It is apparent from the foregoing that once the broad aspects of our invention are disclosed to those skilled in the art, many embodiments thereof will readily suggest themselves, all falling within the spirit of our disclosure. Moreover, many modifications of the present embodiment will likewise present themselves. Accordingly, we desire that the foregoing disclosure be considered as merely illustrative, and not by way of limitation.

We claim as our invention:

1. As a new article of manufacture produced by intermixing perlite ore and plant nutrient and expanding the same by heating at a temperature of about 1500° to 2000° F., an expanded perlite, in which is incorporated, principally within the individual particles thereof and in chemical combination therewith and dispersed therethrough, plant nutrient selected from the group consisting of salts of nitrogen, phosphorus and potassium and with the major part of product of such sizing that it will pass a 20 mesh sieve and slowly leach into the soil with which the product may be mixed.

2. As a new product of manufacture produced by intermixing perlite ore and plant nutrient and expanding the same by heating at a temperature of about 1500° to 2000° F., a soil conditioner and fertilizer comprising expanded siliceous volcanic rock containing magmatic water in which is incorporated chemically therewith and dispersed therethrough plant nutrient selected from the group consisting of major plant foods and mineral trace elements to the extent of about 1.2% to about 55% water-soluble $K_2O$ content, 1.5% to about 40% citrate-soluble $P_2O_5$ content, about 4% to about 30% $N_2$, about 0.01% to about 14% mineral trace element of the group of iron, manganese, zinc, copper, cobalt, boron, and molybdenum, which product displays properties of very slow rate of leaching of the active nutrients into the soil with which the product may be mixed.

3. As a new product of manufacture produced by intermixing perlite ore and plant nutrient and expanding the same by heating at a temperature of about 1500° to 2000° F., a soil conditioner and fertilizer comprising expanded perlite in which is incorporated chemically therewith and dispersed therethrough plant nutrient selected from the group consisting of major plant foods and mineral trace elements to the extent of about 1.2% to about 55% water-soluble $K_2O$ content, 1.5% to about 40% citrate-soluble $P_2O_5$ content, about 4% to about 30% $N_2$, about 0.01% to about 14% of mineral trace element of the group of iron, manganese, zinc, copper, cobalt, boron, and molybdenum, which product displays properties of very slow rate of leaching of the active nutrients into the soil with which the product may be mixed.

4. As a new article of manufacture produced by intermixing perlite ore and plant nutrient and expanding the same by heating at a temperature of about 1500° to 2000° F., a high analyis agricultural fertilizer, which is substantially non-hygroscopic and is substantially fireproof, comprising expanded pumiceous perlite in which is incorporated chemically therewith and dispersed therethrough plant nutrients selected from the group consisting of major plant foods, secondary plant foods and mineral trace elements to the extent of about 1.2% to about 55% water-soluble $K_2O$ content, about 1.5% to about 40% citrate-soluble $P_2O_5$, about 4% to about 30% $N_2$, about 0.01% to about 14% of mineral trace element of the group iron, manganese, zinc, copper, cobalt, boron and molybdenum, in which resulting product minimum segregation of active ingredients exists, and in which only a relatively small part of the active nutrients is retained on the exterior surfaces of the perlite particles, with retention of the major part of such active nutrients being within the cells and pores of the individual perlite particles so that the nutrients leach out very slowly into the soil with which the product may be mixed, and which product is sized so that the major part will pass a 20 mesh sieve.

5. A method of preparing a long life fertilizer comprising intermixing perlite ore with at least one plant nutrient selected from the group consisting of water-soluble salts of potassium, sodium, calcium, magnesium, iron, aluminum, manganese, zinc, copper, cobalt, boron and molybdenm, including the sulphur, phosphorus, nitrogen and chlorine salts thereof; and thereafter expanding the same by heating at a temperature of 1500° to 2000° F. to give a perlite product impregnated with plant nutrient.

6. A method of preparing high analysis long life plant food products comprising crushing and sizing perlite to pass a 30 mesh sieve with bulk density ranging from about 60 to about 80 pounds per cubic foot; intermixing the crushed and sized perlite with a water-soluble plant food salt selected from the group consisting of salts of potassium, sodium, phosphorus, nitrogen, calcium, magnesium, chlorine and sulphur; and heating the admixture to softening temperatures ranging from approximately 1500° to 2000° F. to produce a lightweight product of minutely cellular structure with impregnated food salt.

7. A method of preparing a long life plant food product useful in agriculture comprising comminuting perlite ore by wet-grinding, combining during such wet-grinding a substantial quantity of water-soluble plant nutrient selected from the group consisting of the salts of potassium, sodium, calcium, magnesium, iron, aluminum, manganese, zinc, copper, cobalt, boron and molybdenum; furnacing the ore mixture at high temperatures to expand the same into lightweight minutely cellular structure impregnated with plant nutrient; and grinding the product to pass a 20 mesh sieve.

8. A method of preparing a long life plant food product or fertilizer, comprising comminuting perlite ore to pass a 30 mesh sieve, with bulk density ranging from about 60 to about 80 pounds per cubic foot; intermixing with the perlite a solution of plant nutrient selected from the group consisting of the salts of potassium, sodium, calcium, magnesium, iron, aluminum, manganese, zinc, copper, cobalt, boron and molybdenum; drying and heatting the same to softening temperatures ranging approximately from 1500° to 2000° F. to produce an expanded lightweight product of minutely cellular particle structure impregnated with plant nutrient; and then comminuting the impregnated and expanded product so that the major portion will pass a 20 mesh sieve.

9. A method of preparing a fertilizer having both immediate and prolonged fertilizing characteristics comprising intermixing perlite with at least one plant nutrient selected from the group consisting of water-soluble salts of potassium, sodium, calcium, magnesium, iron, aluminum, manganese, zinc, copper, cobalt, boron and molybdenum; then expanding by heating the admixture; thereafter intermixing said expanded product with at least one plant nutrient selected from the aforesaid group; and comminuting the further-treated product to pass a 20 mesh sive.

References Cited in the file of this patent

UNITED STATES PATENTS

| 2,341,800 | Martin et al. | Feb. 15, 1944 |
| 2,421,902 | Neuschotz | June 10, 1947 |
| 2,602,782 | Zoradi | July 8, 1952 |
| 2,669,510 | Dresser | Feb. 16, 1954 |

OTHER REFERENCES

Bureau of Mines—Perlite, University of Arizona Bulletin, vol. 15, No. 4, October 1944, pages 34 and 35.

Page Converter Company, 710 North Cogswell Road, Calif. Perlite the Wonder Material, pages 1–12.